UNITED STATES PATENT OFFICE.

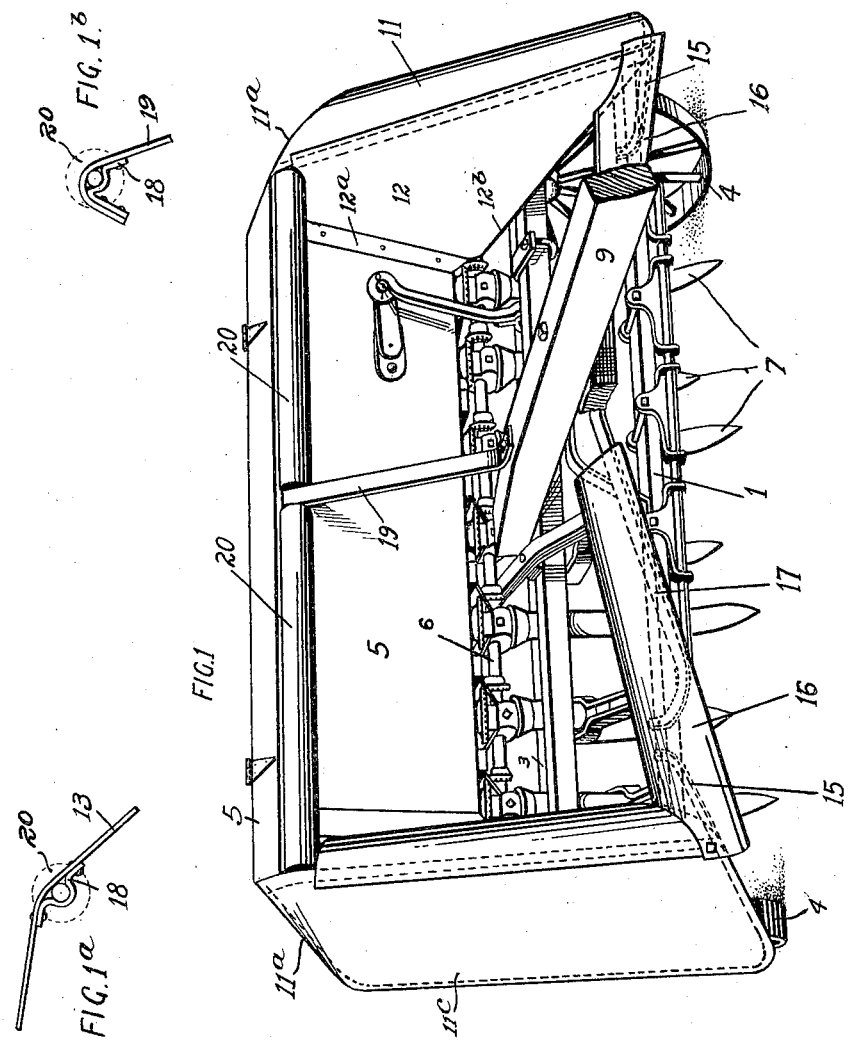

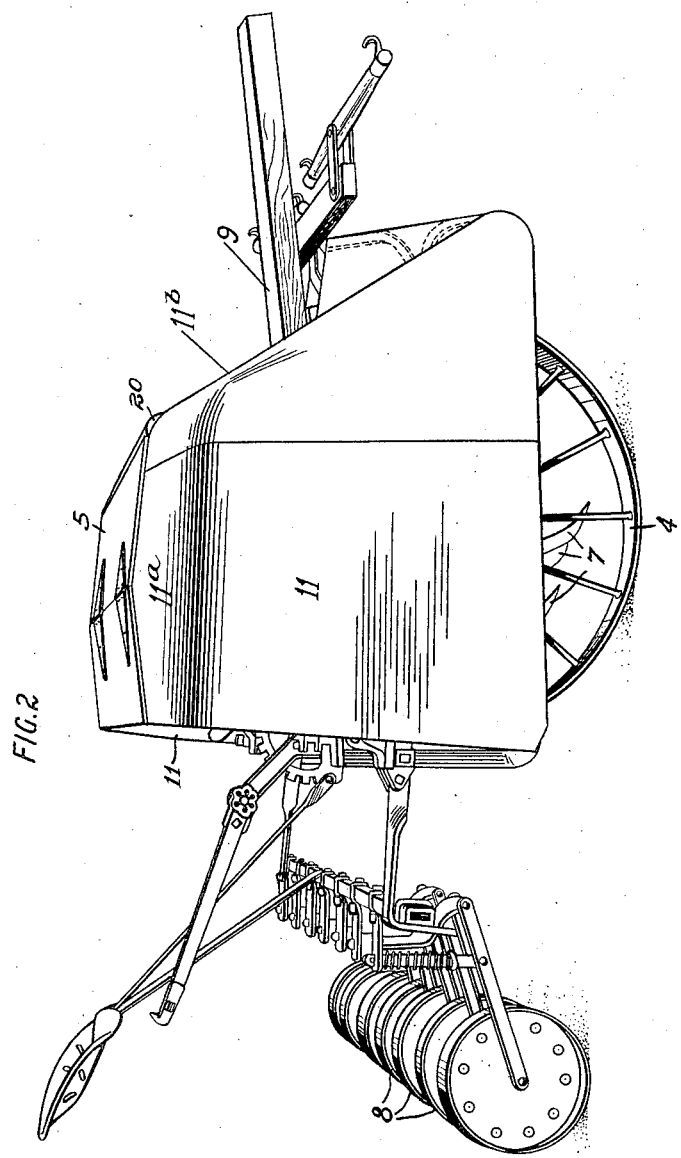

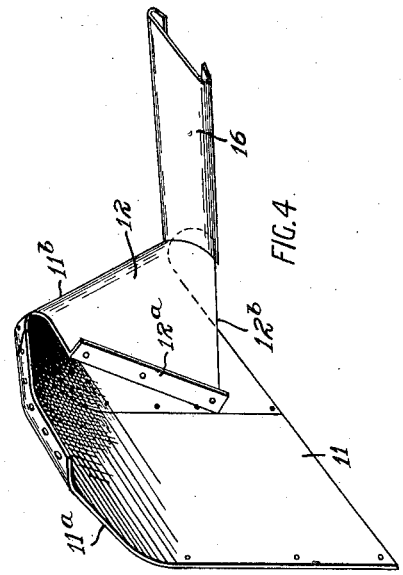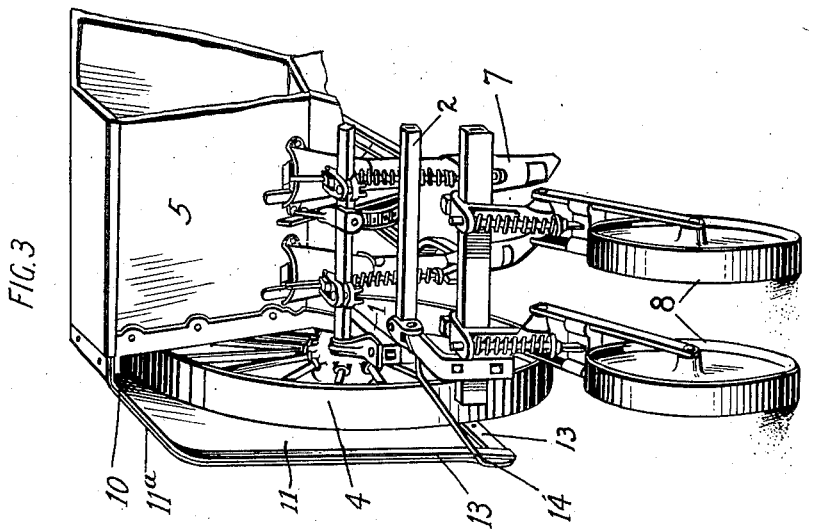

PEARL A. LEWIS AND HENRY N. FAAS, OF SPRINGFIELD, OHIO, ASSIGNORS TO THE AMERICAN SEEDING MACHINE COMPANY, OF SPRINGFIELD, OHIO, A CORPORATION OF OHIO.

FERTILIZER-DISTRIBUTER.

1,032,553.  Specification of Letters Patent.  Patented July 16, 1912.

Application filed January 26, 1912. Serial No. 673,581.

*To all whom it may concern:*

Be it known that we, PEARL A. LEWIS and HENRY N. FAAS, citizens of the United States, residing at Springfield, in the county of Clark and State of Ohio, have invented certain new and useful Improvements in Fertilizer-Distributers, of which the following is a specification.

This invention relates to fertilizer distributers, and more particularly to machines of this class adapted to distribute commercial fertilizing material in orchards and orange groves.

The most beneficial time for distributing fertilizer material among fruit trees, and especially among the trees of orange groves, is when the trees are laden with fruit, at which time the branches hang very low, and it is desirable to deposit the fertilizer material as close to the trunks of the trees as possible, which necessitates driving the machine beneath the fruit laden branches, which, with an ordinary fertilizer distributing machine, causes the branches to become broken and the maturing fruit to be bruised and injured.

Heretofore, attempts have been made to devise a specially constructed machine to obviate the danger of injuring the fruit and branches, but these attempts have resulted in changes in the relative location of certain operating parts of the machine which have resulted in an undesirable construction and interfered with the effective operation of the working parts of the machine, requiring the building of a specially constructed machine for the purpose.

The object of this invention is to devise a construction which will not only protect the branches and fruit of the trees as the machine passes beneath them, but which will also permit the use of a fertilizer distributer of standard construction and one in which the best arrangement of the working parts of the machine can be had.

In the accompanying drawings,—Figure 1 is a view in perspective of the front of a fertilizer distributing machine embodying the invention. Figs. 1ª and 1ᵇ are details of the journals for the anti-friction rolls. Fig. 2 is a view in perspective of the side of said machine. Fig. 3 is a view in perspective of a portion of the rear of the machine. Fig. 4 is a perspective view of the protecting shield or casing, looking at the rear thereof.

Like parts are represented by similar characters of reference in the several views.

The machine to which the improvements have been applied is one of an ordinary type of fertilizer distributers, which employs a main frame which may be of any suitable construction, but which in the present case is mainly formed of a U-shaped hollow tubing 1, constituting the sides and front end of the frame, and a rear bar 2, connecting the ends of the hollow tubing. The frame so formed is mounted upon the axle 3 of carrying wheels 4; the axle extending transversely across the frame so that the carrying wheels will be at the sides of the frame to provide for the best and most perfect balancing of the machine. Mounted upon the frame is the usual hopper 5, in which are located distributing devices of any well-known construction, operated from the feed shaft 6, which receives its motion from the axle 3, in the usual way. A series of furrow openers 7, and presser or covering wheels 8, are carried by the frame in the usual way, and 9 represents the usual tongue connected to, and extending from, the forward part of the frame.

Bolted or otherwise secured to a projecting flange 10, formed on each side of the hopper 5, is a shield or covering 11 for each of the carrying wheels, this shield being inclined sidewise and downwardly for a short distance, as indicated at 11ª, and then projected downwardly parallel with the carrying wheel to a point near the ground. The forward edge 11ᵇ of the shield is formed on an incline and is extended forwardly and then bent inwardly, as indicated at 11ᶜ, so as to embrace the forward rim of the carrying wheel. This shield portion may be constructed of a single piece of sheet metal, but to facilitate manufacture, is preferably made in two parts, riveted together. Riveted to the front part 11ᶜ of the main shield portion, is an auxiliary shield portion 12, which extends rearwardly parallel with the plane of the carrying wheel, the rear edge 12ª thereof being cut to conform to the shape of the hopper and being bent at right-angles to the main part 12 and secured to the hopper in any suitable manner. The lower edge 12ᵇ of this auxiliary shield portion is preferably extended down to the frame parts but need not be connected therewith. The shields thus formed are preferably stiffened and strengthened by bars 13, riveted to the inside edges thereof, as shown in Fig. 3. The lower rear end of each one of the shields is preferably further supported by a brace rod 14, which is attached to some suitable point of the frame of the machine. The lower front portion of each of the shields is likewise preferably connected to the main frame by a brace rod 15, (shown in dotted lines in Fig. 1). As a further protection, we have also provided on each side of the lower forward part of the machine, an auxiliary shield portion 16, somewhat channel-shaped in form, as shown in Fig. 4, the outer end of which is riveted or otherwise secured to the lower forward part of the shield portion 12, and which extends over and covers the front bar 1 of the frame and some of the parts which are connected to the forward part of the frame, such as the drag-bar connections. This shield portion extends in proximity to the tongue 9, and is further supported by a brace-rod 17, (shown in dotted lines in Fig. 1), the inner end of said rod being connected with the tongue of the machine.

Suitably journaled in ears 18, formed on one of the bars or frame pieces 13, at each side of the machine, and also in ears formed on the brace piece 19, as shown in Figs. 1ᵃ and 1ᵇ respectively, and extending along the upper forward edge of the hopper so as to lie substantially flush or slightly below the forward edge of the hopper, are rollers 20, the function of which is to provide in effect a revoluble forward upper corner for the hopper for the purpose of easing over any of the fruit-laden branches that may happen to get inside the protecting carrying wheel shields. It will be seen that the outer end of each of these rolls extends within the casing formed by the shield portions previously described and that the shield portion 12 is conformed somewhat to the shape of the roll, so that there will be no projecting sharp edges at the upper edge of the hopper to catch the fruit or branches.

Having thus described our invention we claim:—

1. In a distributing machine, a main frame, a hopper mounted thereon, a carrying wheel located at the side of said main frame and hopper, and a fender extending from the upper side edge of said hopper and across the space between said hopper and carrying wheel and downwardly along the side of said carrying wheel.

2. In a distributing machine, a main frame, a hopper mounted thereon, a carrying wheel located at the side of said main frame and hopper, a main fender portion extending from the upper side edge of said hopper and across the space between said hopper and carrying wheel and downwardly along the outside of said carrying wheel, and an auxiliary fender portion extending from said main fender portion about the front of said carrying wheel and along the inside of said carrying wheel.

3. In a distributing machine, a main frame, a hopper mounted thereon, and a carrying wheel located at the side of said frame and hopper, of an inclosing fender for the outer side, front, and forward portion of the inside of said carrying wheel supported by said hopper, said fender also inclosing the space between the upper side edge of said hopper and said carrying wheel.

4. In a distributing machine, a main frame, a hopper mounted thereon, a carrying wheel located at the side of said hopper and frame, a casing inclosing the outside, the front and forward inside of said carrying wheel, said casing also extending over the space from the upper side edge of said hopper and the carrying wheel, and an auxiliary fender portion extending from said casing inwardly over the forward part of said frame.

5. In a distributing machine, a main frame, a hopper mounted thereon, a carrying wheel located at the side of said hopper and frame, an inclosing casing for the carrying wheel, said casing also extending over the space between the upper side edge of said hopper and said carrying wheel, and an anti-friction roller along the length of the hopper in proximity to the forward upper edge thereof.

6. In a distributing machine, a main frame, a hopper mounted thereon, a carrying wheel located at the side of said hopper and frame, a fender extending from the upper side edge of said hopper and across the space between the hopper and wheel and downwardly along the side of said wheel, and an anti-friction roller located in proximity to the forward upper edge of said hopper.

In testimony whereof, we have hereunto set our hands this 20th day of January, 1912.

PEARL A. LEWIS.
HENRY N. FAAS.

Witnesses:
CHAS. I. WELCH,
ESTHER E. PFEIFER.

---

Copies of this patent may be obtained for five cents each, by addressing the "Commissioner of Patents, Washington, D. C."